(12) United States Patent
Tiirola et al.

(10) Patent No.: US 10,972,230 B2
(45) Date of Patent: Apr. 6, 2021

(54) METHOD AND APPARATUS FOR SENDING FEEDBACK USING TWO-STAGE UPLINK SCHEDULING

(71) Applicant: NOKIA SOLUTIONS AND NETWORKS OY, Espoo (FI)

(72) Inventors: Esa Tapani Tiirola, Kempele (FI); Kari Juhani Hooli, Oulu (FI); Timo Erkki Lunttila, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 110 days.

(21) Appl. No.: 16/327,656

(22) PCT Filed: Aug. 25, 2016

(86) PCT No.: PCT/EP2016/070113
§ 371 (c)(1),
(2) Date: Feb. 22, 2019

(87) PCT Pub. No.: WO2018/036631
PCT Pub. Date: Mar. 1, 2018

(65) Prior Publication Data
US 2019/0238279 A1    Aug. 1, 2019

(51) Int. Cl.
*H04L 1/18*    (2006.01)
*H04L 5/00*    (2006.01)

(52) U.S. Cl.
CPC .......... *H04L 1/1854* (2013.01); *H04L 1/1887* (2013.01); *H04L 1/1893* (2013.01); *H04L 5/0055* (2013.01); *H04L 5/001* (2013.01); *H04L 5/0051* (2013.01); *H04L 5/0053* (2013.01)

(58) Field of Classification Search
CPC ... H04L 1/1854; H04L 1/1893; H04L 1/1887; H04L 5/0055; H04L 5/001; H04L 5/0051; H04L 5/0053
See application file for complete search history.

(56) References Cited

U.S. PATENT DOCUMENTS

2015/0327295 A1* 11/2015 Yang .................... H04L 1/1854
370/337
2017/0317794 A1* 11/2017 You ...................... H04L 5/0051

OTHER PUBLICATIONS

Nokia, Alcatel-Lucent Shanghai Bell, On Two-Stage UL scheduling for eLAA, 3GPP TSG RAN WG1 Meeting #86, Gothenburg, Sweden, Aug. 22-26, 2016, R1-167074 (Year: 2016).*
Nokia, Alcatel-Lucent Shanghai Bell , DL HARQ-ACK for eLAA, 3GPP TSG-RAN WG1 Meeting #84bis, Busan, Korea, Apr. 11-15, 2016, R1-162818 (Year: 2016).*
International Search Report & Written Opinion dated Apr. 19, 2017 corresponding to International Patent Application No. PCT/EP2016/070113.

(Continued)

*Primary Examiner* — Shailendra Kumar
(74) *Attorney, Agent, or Firm* — Squire Patton Boggs (US) LLP (57) ABSTRACT

A method comprises receiving in a first subframe of a burst from a base station a downlink transport block for which an acknowledgement is required. A first uplink channel in which an acknowledgement of said transport block to be provided is prepared. The first uplink channel is independent of transmission information. The first prepared uplink channel is transmitted with the acknowledgement in a later burst.

16 Claims, 8 Drawing Sheets

(56) References Cited

OTHER PUBLICATIONS

Nokia et al., "On Two-Stage UL scheduling for eLAA," 3GPP Draft; R1-167074, 3GPP TSG RAN WG1 Meeting #86, Gothenburg, Sweden, Aug. 21, 2016, XP051125685.
Nokia et al., "DL HARQ-ACK for eLAA," 3GPP Draft; R1-162818, 3GPP TSG-RAN WG1 Meeting #84bis, Busan, Korea, Apr. 1, 2016, XP051079701.

* cited by examiner

METHOD AND APPARATUS FOR SENDING FEEDBACK USING TWO-STAGE UPLINK SCHEDULING

This disclosure relates to a method and apparatus, and in particular but not exclusively to a method and apparatus for providing a channel for acknowledgment.

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or WiFi). Wi-Fi is often used synonymously with WLAN.

The wireless systems can be divided into cells, and are therefore often referred to as cellular systems. A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. Further development of LTE are sometimes referred to as LTE Advanced (LTE-A). The various development stages of 3GPP specifications are referred to as releases. In this description 3GPP release versions are distinguished by acronym "Rel-nn".

In addition to LTE evolution, 3GPP has initiated a study item targeting a new radio generation (5G) called new radio (NR). NR does not require backwards compatibility with LTE. Instead, it aims at tight interworking between the RAT (radio access technology) and LTE. An objective of a NR study item is to identify and develop technology components needed for new radio (NR) systems to use any spectrum band ranging at least up to 100 GHz. The aim may be to achieve a single technical framework addressing usage scenarios, requirements and deployment scenarios defined in for example TR 38.913. The new radio access technology may be forward compatible to allow specification in two separate phases (Phase I and Phase II).

Rel-13 LTE LAA (Licensed Assisted Access) specifications are aimed to provide definitions for licensed-assisted access to unlicensed radio spectrum. The access is intended to coexist with other technologies and fulfil regulatory requirements. In Rel-13 LAA, unlicensed spectrum is utilized to improve LTE downlink (DL) throughput. Unlicensed band operation may need to be supported also by (5G) new radio.

According to an aspect, there is provided a method comprising: receiving in at least one first subframe of a burst from a base station at least one downlink transport block for which an acknowledgement is required; preparing a first uplink channel in which an acknowledgement of said transport block to be provided, wherein said first uplink channel is independent of transmission information; causing transmission of said first prepared uplink channel, with said acknowledgement, in a later burst; receiving uplink scheduling information from said base station; preparing a second uplink channel according to uplink scheduling information received from said base station, wherein said second uplink channel depends on transmission information associated with said scheduling information; and causing transmission of said second prepared uplink channel in a later burst.

The transmission information may comprise transmission time information.

The uplink scheduling information may be received in at least one downlink control channel.

The method may comprise receiving a trigger from said base station, wherein said transmitting of said first prepared uplink channel occurs a first time offset after receiving said trigger from the base station.

The transmitting of said second prepared channel may occur a second time offset after receiving said uplink scheduling information.

The first time offset may be smaller than said second time offset.

The second time offset may comprise x subframes after receiving said uplink scheduling information.

X may be 4.

For said second uplink channel at least one of the following may be dependent on said transmission information: a reference signal sequence; reference signal cyclic shift; data bit or symbol scrambling; and data bit interleaving.

The transmission information may comprise at least one of subframe number and slot number.

At least one of said first and second uplink channel may comprise a physical uplink channel.

The first uplink channel may be a short channel.

The acknowledgement may comprise a hybrid automatic repeat request acknowledgement.

The first uplink channel may be a control channel.

The second uplink channel may be a shared channel.

At least one downlink transport block may comprise a physical downlink channel.

The physical downlink channel may comprise at least one of a control channel and a shared channel.

According to another aspect, there is provided a method comprising: receiving in at least one first subframe of a burst from a base station at least one downlink transport block for which an acknowledgement is required; preparing a first uplink channel in which an acknowledgement of said transport block to be provided, wherein said first uplink channel is independent of transmission information; and causing transmitting of said first prepared uplink channel, with said acknowledgement.

This aspect may be used in conjunction with any one or more of the above features.

According to another aspect, there is provided an apparatus comprising: means for receiving, in at least one first subframe of a burst from a base station, at least one downlink transport block for which an acknowledgement is required and for receiving uplink scheduling information from said base station; means for preparing a first uplink channel in which an acknowledgement of said transport block is to be provided, wherein said first uplink channel is independent of transmission information and for preparing a second uplink channel according to the uplink scheduling information received from said base station, wherein said second uplink channel depends on transmission information associated with said scheduling information; and means for causing transmitting of said first prepared uplink channel, with said acknowledgement, in a later burst, and for causing transmitting of said second prepared uplink channel in a later burst.

The receiving means may be for receiving said uplink scheduling information in at least one downlink control channel.

The transmission information may comprise transmission time information.

The receiving means may be for receiving a trigger from said base station, wherein said transmitting of said first prepared uplink channel occurs a first time offset after receiving said trigger from the base station.

The means for causing transmitting may be for causing transmitting of said second prepared channel a second time offset after receiving said uplink scheduling information.

The first time offset may be smaller than said second time offset.

The second time offset may comprise x subframes after receiving said uplink scheduling information.

X may be 4.

For said second uplink channel at least one of the following may be dependent on said transmission information: a reference signal sequence; reference signal cyclic shift; data bit or symbol scrambling; and data bit interleaving.

The transmission information may comprise at least one of subframe number and slot number.

At least one of said first and second uplink channel may comprise a physical uplink channel.

The first uplink channel may be a short channel.

The acknowledgement may comprise a hybrid automatic repeat request acknowledgement.

The first uplink channel may be a control channel.

The second uplink channel may be a shared channel.

At least one downlink transport block may comprise a physical downlink channel.

The physical downlink channel may comprise at least one of a control channel and a shared channel.

The apparatus may be provided in a user device.

According to another aspect, there is provided an apparatus for use in a user equipment, said apparatus comprising at least one processor and at least one memory including computer code for one or more programs, the at least one memory and the computer code configured, with the at least one processor, to cause the apparatus at least to: receive in at least one first subframe of a burst from a base station at least one downlink transport block for which an acknowledgement is required; prepare a first uplink channel in which an acknowledgement of said transport block to be provided, wherein said first uplink channel is independent of transmission information; cause said first prepared uplink channel to be transmitted, with said acknowledgement, in a later burst; receive uplink scheduling information from said base station; prepare a second uplink channel according to uplink scheduling information received from said base station, wherein said second uplink channel depends on transmission information associated with said scheduling information; and cause said second prepared uplink channel to be transmitted in a later burst.

The transmission information may comprise transmission time information.

The uplink scheduling information may be received in at least one downlink control channel.

The at least one memory and the computer code may be configured, with the at least one processor, to cause the apparatus to receive a trigger from said base station, wherein said transmitting of said first prepared uplink channel occurs a first time offset after receiving said trigger from the base station.

The transmitting of said second prepared channel may occur a second time offset after receiving said uplink scheduling information.

The first time offset may be smaller than said second time offset.

The second time offset may comprise x subframes after receiving said uplink scheduling information.

X may be 4.

For said second uplink channel at least one of the following may be dependent on said transmission information: a reference signal sequence; reference signal cyclic shift; data bit or symbol scrambling; and data bit interleaving.

The transmission information may comprise at least one of subframe number and slot number.

At least one of said first and second uplink channel may comprise a physical uplink channel.

The first uplink channel may be a short channel.

The acknowledgement may comprise a hybrid automatic repeat request acknowledgement.

The first uplink channel may be a control channel.

The second uplink channel may be a shared channel.

At least one downlink transport block may comprise a physical downlink channel.

The physical downlink channel may comprise at least one of a control channel and a shared channel.

The apparatus may be provided in a user device.

According to another aspect, there is provided a method comprising: causing transmission from a base station, in at least one first subframe of a burst, at least one downlink transport block for which an acknowledgement is required; receiving a first uplink channel, with said acknowledgement, in a later burst, wherein said first uplink channel is independent of transmission information; causing transmission from the base station of uplink scheduling information; and receiving a second uplink channel in a later burst, said second uplink channel being in accordance with said uplink scheduling information, wherein said second uplink channel depends on transmission information associated with said scheduling information.

The transmission information may comprise transmission time information.

The uplink scheduling information may be transmitted in at least one downlink control channel.

The method may comprise causing transmitting of a trigger from said base station, wherein said receiving of said first uplink channel occurs a first time offset after transmitting said trigger.

The receiving of said second channel may occur a second time offset after receiving said uplink scheduling information.

The first time offset may be smaller than said second time offset.

The second time offset may comprise x subframes after transmitting said uplink scheduling information.

X may be 4.

For said second uplink channel at least one of the following may be dependent on said transmission information: a reference signal sequence; reference signal cyclic shift; data bit or symbol scrambling; and data bit interleaving.

The transmission information may comprise at least one of subframe number and slot number.

At least one of said first and second uplink channel may comprise a physical uplink channel.

The first uplink channel may be a short channel.

The acknowledgement may comprise a hybrid automatic repeat request acknowledgement.

The first uplink channel may be a control channel.

The second uplink channel may be a shared channel.

At least one downlink transport block may comprise a physical downlink channel.

The physical downlink channel may comprise at least one of a control channel and a shared channel.

The method may be performed in a base station.

According to another aspect, there is provided an apparatus for use in a base station, said apparatus comprising at least one processor and at least one memory including computer code for one or more programs, the at least one memory and the computer code configured, with the at least one processor, to cause the apparatus at least to: cause transmission, in at least one first subframe of a burst, at least one downlink transport block for which an acknowledgement is required; receive a first uplink channel, with said acknowledgement, in a later burst, wherein said first uplink channel is independent of transmission information; cause transmission of uplink scheduling information; and receive a second uplink channel in a later burst, said second uplink channel being in accordance with said uplink scheduling information, wherein said second uplink channel depends on transmission information associated with said scheduling information.

The transmission information may comprise transmission time information.

The uplink scheduling information may be transmitted in at least one downlink control channel.

The at least one memory and the computer code may be configured, with the at least one processor, to cause the apparatus to cause transmission of a trigger, wherein said receiving of said first uplink channel occurs a first time offset after transmitting said trigger.

The receiving of said second channel may occur a second time offset after receiving said uplink scheduling information.

The first time offset may be smaller than said second time offset.

The second time offset may comprise x subframes after transmitting said uplink scheduling information.

X may be 4.

For said second uplink channel at least one of the following may be dependent on said transmission information: a reference signal sequence; reference signal cyclic shift; data bit or symbol scrambling; and data bit interleaving.

The transmission information may comprise at least one of subframe number and slot number.

At least one of said first and second uplink channel may comprise a physical uplink channel.

The first uplink channel may be a short channel.

The acknowledgement may comprise a hybrid automatic repeat request acknowledgement.

The first uplink channel may be a control channel.

The second uplink channel may be a shared channel.

At least one downlink transport block may comprise a physical downlink channel.

The physical downlink channel may comprise at least one of a control channel and a shared channel.

According to another aspect, there is provided an apparatus comprising: means for causing transmission from a base station, in at least one first subframe of a burst, of at least one downlink transport block for which an acknowledgement is required; and means for receiving a first uplink channel, with said acknowledgement in a later burst, wherein said first uplink channel is independent of transmission information, said causing means being for causing transmission from the base station of uplink scheduling information and said receiving means being for receiving a second uplink channel in a later burst, said second uplink channel being in accordance with said uplink scheduling information, wherein said second uplink channel depends on transmission information associated with said scheduling information.

The transmission information may comprise transmission time information.

The uplink scheduling information may be transmitted in at least one downlink control channel.

The means for causing transmitting may be for causing transmitting of a trigger from said base station, wherein said receiving of said first uplink channel occurs a first time offset after transmitting said trigger.

The receiving means may be for receiving said second channel a second time offset after receiving said uplink scheduling information.

The first time offset may be smaller than said second time offset.

The second time offset may comprise x subframes after transmitting said uplink scheduling information.

X may be 4.

For said second uplink channel at least one of the following may be dependent on said transmission information: a reference signal sequence; reference signal cyclic shift; data bit or symbol scrambling; and data bit interleaving.

The transmission information may comprise at least one of subframe number and slot number.

At least one of said first and second uplink channel may comprise a physical uplink channel.

The first uplink channel may be a short channel.

The acknowledgement may comprise a hybrid automatic repeat request acknowledgement.

The first uplink channel may be a control channel.

The second uplink channel may be a shared channel.

At least one downlink transport block may comprise a physical downlink channel.

The physical downlink channel may comprise at least one of a control channel and a shared channel.

A computer program comprising program code means adapted to perform the herein described methods may also be provided. In accordance with further embodiments apparatus and/or computer program product that can be embodied on a non transitory computer readable medium for providing at least one of the above methods is provided.

It should be appreciated that any feature of any aspect may be combined with any other feature of any other aspect.

Various other aspects and further embodiments are also described in the following detailed description of examples embodying the invention and in the attached claims.

Some embodiments will now be described in further detail, by way of example only, with reference to the following examples and accompanying drawings, in which.

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, device 20 of FIG. 2 and control apparatus thereof, to assist in understanding the described examples.

A communication device can be used for accessing various services and/or applications provided via a communication system. In wireless communication systems the access is provided via a wireless access interface between wireless communication devices and an appropriate access system. A device may access wirelessly a communication system via a base station. A base station site can provide one or more cells of a cellular system. In the FIG. 1 example, a base station 12 can provide e.g. three cells on different carriers. In addition to the base station 12, at least one serving cell can also be provided by means of another station or stations. For example, at least one of the carriers may be provided by a station that is not co-located at base station 12. This possibility is denoted by station 11 in FIG. 1. Interaction between the different stations and/or controllers thereof can be arranged in various manners. Each communication device 20 and base station may have one or more radio channels open at the same time and may receive signals from more than one source.

Figure 1:
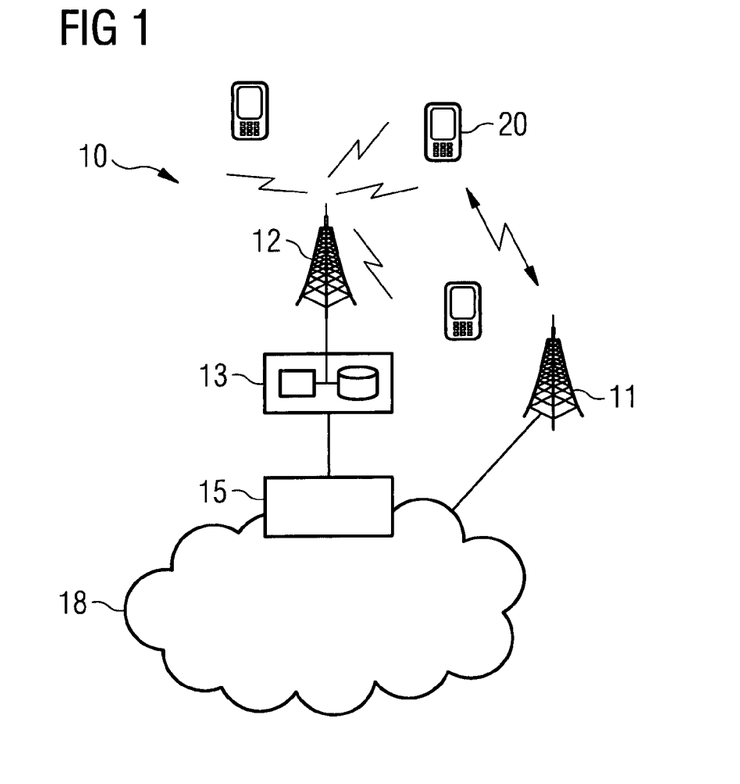
FIG. 1 shows a schematic example of a system where the invention may be implemented.

A base station may have a control apparatus 13 and/or may be connected to a controller which has the control apparatus. In the latter case, the controller may serve a plurality of base stations.

A base station node can be connected to a data network 18 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

A communication device can access a communication system based on various access techniques, for example those based on the third Generation Partnership Project (3GPP) specifications. A non-limiting example of mobile architectures is known as the Evolved Universal Terrestrial Radio Access Network (E-UTRAN). A non-limiting example of base station of a cellular system is what is termed as a NodeB or enhanced NodeB (eNB) in the vocabulary of the 3GPP specifications. The eNBs may provide E-UTRAN features such as user plane Radio Link Control/Medium Access Control/Physical Layer Protocol (RLC/MAC/PHY) and control plane Radio Resource Control (RRC) protocol terminations towards mobile communication devices.

Figure 2:
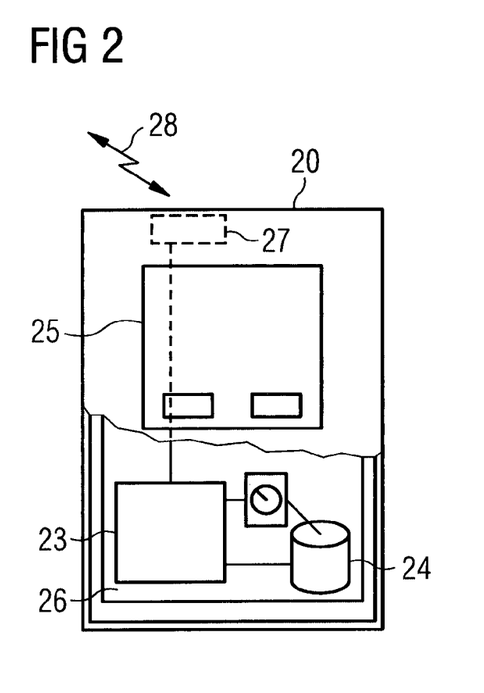
FIG. 2 shows an example of a communication device.

FIG. 2 shows a schematic, partially sectioned view of a communication device 20 that a user can use for communications. Such a communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A communication device is typically provided with at least one data processing entity 23, at least one memory 24 and optionally other possible components for use in software and hardware aided execution of tasks it is designed to perform, including control of access to and communications via base stations and/or other user terminals. The data processing, storage and other relevant control apparatus can be provided on an appropriate circuit board and/or in chipsets and/or in one or more integrated circuits. This apparatus is denoted by reference 26.

Various functions and operations of a communications device are arranged into layers in accordance with a hierarchical model. In the model lower layers report to higher layers and receive instructions therefrom.

A user may control the operation of the device 20 by means of a suitable user interface such as key pad, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus may be provided with cognitive radio capability. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

3GPP has defined the concepts of user equipment (UE) specific primary cells (PCell) and secondary cells (SCells).

In applications such as carrier aggregation at least but typically only one of the serving cells is denoted primary cell (PCell) whereas the other serving cells are secondary cells (SCells). In the context of LAA, one or more LAA DL secondary cells (SCells) may be configured to a user equipment (UE) as a part of DL carrier aggregation (CA) configuration, while the primary cell (PCell) needs to be on the licensed spectrum. It is expected that Rel-13 LTE LAA will also evolve to support also LAA uplink (UL) transmissions on unlicensed spectrum in later releases, for example in LTE Rel-14.

The LTE LAA approach in Rel-13 based on CA framework assumes transmission of uplink control information (UCI) on the PCell (licensed band). However, LAA may be extended with uplink support including PUCCH (physical uplink control channel and UCI transmission on PUSCH, as well as in dual connectivity operation (i.e. allowing for non-ideal backhaul between PCell in licensed spectrum and SCell(s) in unlicensed spectrum).

Standalone LTE operation on unlicensed spectrum might be desired in certain applications. LTE standalone operation on unlicensed spectrum would mean that eNB/UE air interface rely solely on unlicensed spectrum without any carrier on licensed spectrum.

Both dual connectivity and standalone operation modes will require transmission of UCI/PUCCH on unlicensed spectrum.

Listen-Before-Talk (LBT) type protocol can be used for opportunistic allocation of resources. Listen-Before-Talk is a contention-based protocol used in wireless communication by allowing several devices to share the same spectrum or channel. If a device wants to transmit information, the device will have to first check that the channel is not already in use.

In LTE operation on unlicensed carriers, depending on the regulatory rules, the UE may need to perform LBT prior to any UL transmission. Some exceptions may exist though.

At least in some regions, transmission of ACK/NACK (acknowledgement/negative acknowledgement) feedback may be possible without LBT when immediately following a DL transmission (similar to Wi-Fi operation).

Short control signalling (SCS) rules defined for Europe by ETSI (European Telecommunications Standards Institute) allow for transmission of control signalling with a duty cycle of no more than 5% over 50 ms period without performing LBT. Short control signalling transmissions are transmissions used by adaptive equipment to send management and control frames (e.g. ACK/NACK signals) without sensing the channel for the presence of other signals. It may not be required for adaptive equipment to implement short control signalling transmissions.

If implemented, short control signalling transmissions of adaptive equipment may have a maximum duty cycle of 5% within an observation period of 50 ms. At least in some regions, scheduled UL transmissions may in general be allowed without LBT, when the transmission follows directly a DL transmission before which the eNodeB has performed LBT and total transmission time covering both DL and UL is limited by the maximum TX burst time defined by the associated regulator.

Another example is where, at least in some regions, scheduled UL transmissions may in general be allowed without LBT (or with one shot LBT only), when the transmission follows directly a DL transmission before which the eNodeB has performed LBT and the total transmission time covering both DL and UL is limited by a maximum transmission TX burst time defined by the appropriate regulator.

Short PUCCH is a PUCCH structure occupying a few symbols (such as 4 symbols). Short PUCCH is time-domain multiplexed with the PUSCH (physical uplink shared channel). Short PUCCH may support two or more short PUCCH formats. For example, there may be a short PUCCH format designed for transmission of multiple HARQ (Hybrid Automatic Repeat Request)-ACK bits, and another short PUCCH format designed for transmission of PRACH (physical random access channel), SR (scheduling request), and SRS (sounding reference signal).

Long PUCCH refers to a PUCCH structure occupying a PUSCH B-IFDMA (interleaved frequency division multiple access) interlace and predefined transmission timing (such as 1 ms, i.e. 14 SCFDMA (single-carrier frequency division multiplexing) symbols). Long PUCCH is frequency division multiplexed with the PUSCH.

As sPUCCH is located right after the DL TX burst it may not require a full Category 4 LBT with an exponential back off. Category 4 is an agreed LBT mechanism in 3GPP. It is based on CSMA/CA (carrier sense multiple access/collision avoidance) which is a protocol used in Wi-Fi. This protocol has a defer period, for example DIFS (DCF (distributed coordination function) interframe space) or AIFS (arbitration interframe space). It uses an adaptive contention window size (q value), (exponential back off).

Instead of category 4 LBT, it may be based on either one shot LBT or no LBT. In this the mode, the transmitting node shall sense the channel for at least a sensing interval (such as 25 μs) immediately before the transmission on the channel. A node may transmit on the channel immediately after sensing the channel, if the power detected during the sensing interval is less than the energy detection threshold.

LTE standalone operation may be developed in a proprietary manner. MulteFire (MLF) developed by Nokia is such an example. In MulteFire, it has been proposed that two types of PUCCH formats are supported—short PUCCH and long PUCCH.

The aim of the MulteFire technology is to create a new telecommunications system where LTE radio technology is used on an unlicensed radio band. Some embodiments may support regular LTE by extending LTE service into unlicensed radio band using for example a so-called MulteFire radio. However it should be appreciated that embodiments are not limited to a LTE type of cellular service, and could support e.g., a 3G radio service or a 5G radio service. Alternatively or additionally MulteFire may provide local internet connectivity and/or mobility within the MulteFire network. In some embodiments, this may be independent of any cellular operator and/or subscriber information module (SIM) card presence.

MulteFire radio may be independent of LTE radio presence in a licensed band. This contrasts with 3GPP specific unlicensed technologies like LAA and LTE-U, designed to operate on unlicensed band frequencies. By way of example only, MulteFire may operate in the same 5 GHz band in which Wi-Fi operates. Alternatively or additionally any other suitable frequency band may be used. MulteFire technology may be applied also to certain spectrum sharing scenarios, e.g. the 3.5 GHz band in US.

Figure 7:
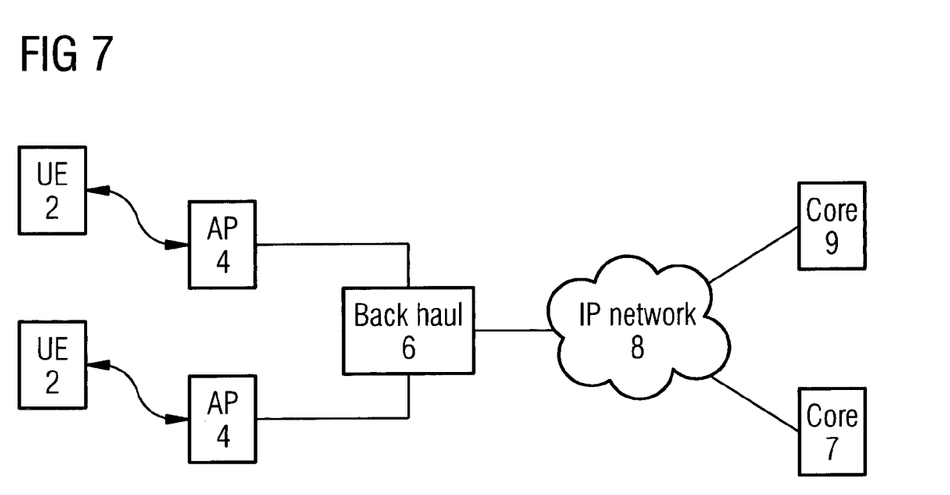
FIG. 7 shows an example of a system using unlicensed carriers.

Reference is made to FIG. 7 which schematically shows a proposed MulteFire system. On the radio interface, MulteFire may rely on LTE technology. In some embodiments, there may be as few modifications as compared to LTE as possible. In the MulteFire system, user devices 2 such as previously described may be used. These user devices are referenced to as UE 2 in FIG. 7. These devices may be conventional user equipment which are configured and/or able to be used with Wi-Fi. Alternatively or additionally conventional user equipment may be modified in order to operate with a MulteFire network. Alternatively or additionally user equipment configured to work specifically with a MulteFire network may be provided.

The MulteFire system will use access points AP 4. These access points may be base stations or the like. In the MulteFire system, the radio interface may terminate on the UE 2 and on AP 4 on network side.

The access points AP 4 may be connected to a backhaul 6. The backhaul 6 may be configured to connect to an IP network 8 or the like. The IP network 8 may be coupled to a cellular core network 9 or a dedicated core network 7. Thus, the MulteFire access point AP 6 may be connected to conventional cellular core network 9, i.e. EPC (Evolved Packet Core). This is the LTE packet core. MulteFire deployment in such model may be referred to as EPC connected mode. In another embodiment, the access point AP 6 may alternatively or additionally be connected to a MulteFire core network (MF CN) 7 that provides the necessary core network functions for MulteFire operations. This deployment model may be referred to as neutral host mode. The MulteFire CN may be as simple as possible in some embodiments. For example, in some embodiments, the MulteFire core network may be provided in one physical network equipment hardware. In some embodiments the MulteFire core network may be integrated into one or more APs. Alternatively, the MulteFire CN can also be realized as a virtualized implementation. When the MulteFire network is deployed with MulteFire core network, the network set up may use aspects of a typical Wi-Fi deployment.

Due to regulatory restrictions, UL transmission in proprietary systems such as MulteFire is based on interlaces consisting of multiple (e.g. 6 or 10) equally spaced 1-PRB (physical resource block) clusters.

In particular, the uplink resource allocation in MulteFire may be based on B-IFDMA (block interleaved frequency domain multiple access). The design may be based on ten 10-PRB (physical resource block) interlaces with for example a 20 MHz bandwidth.

Figure 3A:
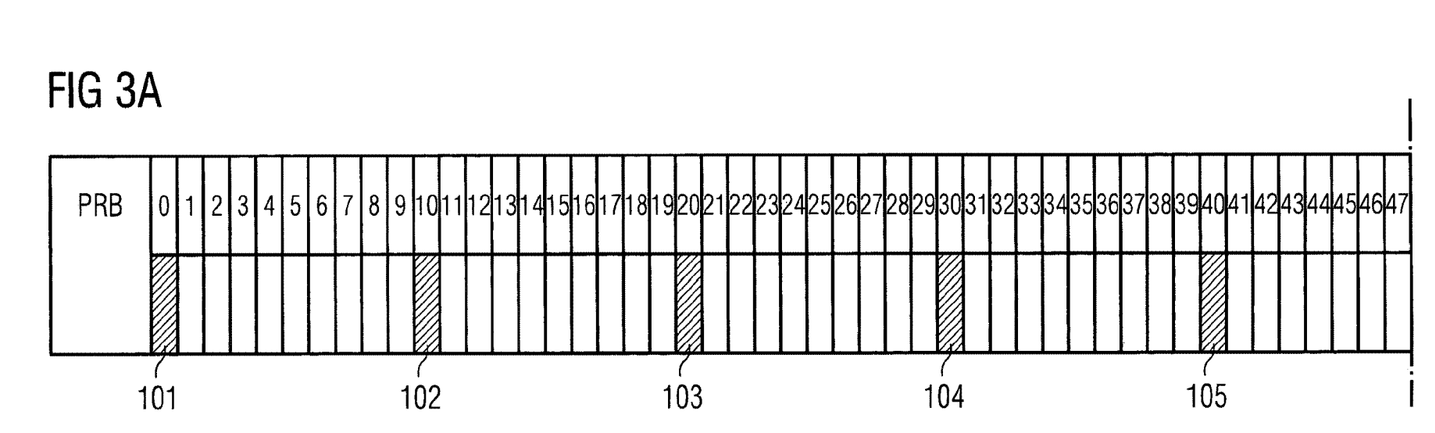
FIG. 3 shows an example of an interlace.
Figure 3B:
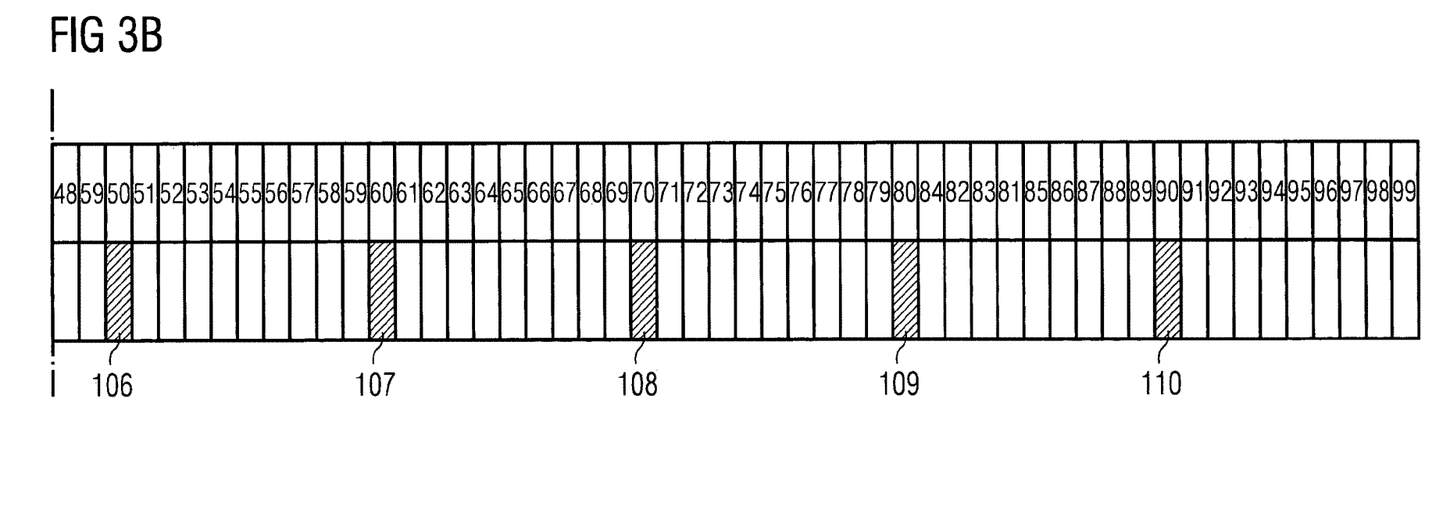

Reference is made to FIG. 3 which shows one interlace. An interlace has ten uniformly spaced resource blocks referenced 101 to 110. These interlace resource blocks are every 10 blocks. A minimum allocation of 20 MHz bandwidth corresponds to 10 PRBs.

B-IFDMA has been be adopted also for Rel-14 LAA UL.

sPUCCH transmission utilizes one or more interlaces in frequency and a predetermined number of DFT-S-OFDMA (Discrete Fourier Transform Spread Orthogonal Frequency Division Multiple Access) symbols, e.g., 4 symbols, in time.

C-PDCCH (common physical control channel) will now be described. Rel-13 LAA supports common signaling to indicate the type (normal or DwPTSO-like (downlink pilot time slot)) of the current and the next subframe. DCI (downlink control information) format 1C is used for common signaling and the indication defined for Rel-13 results in a 4-bit payload. Hence, there are 11 bits available for future use (such as for the indication of UL subframes) when operating with a 20 MHz carrier bandwidth and 9 bits in the 10 MHz case, respectively.

An UL burst indicator included in C-PDCCH may facilitate further power saving for the non-scheduled UEs. When a Rel-14 UE receives an UL TX burst indicator for certain subframes it may regard such subframes as DRX (discontinuous reception) subframes (if the subframe is not an UL subframes with a valid PUSCH (physical uplink shared channel) grant). If the subframes are regarded as discontinuous reception subframes, then BB (baseband) samples are not created including FFT (fast Fourier transform) operation, there is not attempt to detect a DL transmission e.g. based on CRS (common reference signal) blind detection and the (E)PDCCH ((enhanced) physical downlink control channel) is not monitored during the indicated UL subframes.

The current C-PDCCH design related to UL burst is currently open in both LAA and MulteFire. The available bits (that is the 11 bits in the case of 20 MHz carrier) of the C-PDCCH can be used to indicate the properties of UL TX burst. Proposed information elements may comprise one or more of: starting subframe of the UL burst with respect to the position of the indicator (subframe offset); the UL TX burst length within MOOT (maximum channel occupancy time); indicating a no LBT option for SRS/UCI (signaling reference signal/uplink control information); ePUCCH (enhanced PUCCH) trigger; enabling transmission of pending 2-stage grant; and sPUCCH related information.

The C-PDCCH indicates the location of sPUCCH in time. Hence, the UE detects the C-PDCCH in order to transmit UCI such as HARQ-ACK (hybrid automatic repeat request—ACK) via the sPUCCH.

Both LTE LAA and MulteFire currently propose using n+4 timing as the minimum constraint for UE to send ACK/NACK information for the PDSCH (physical downlink shared channel) received in subframe n. In other words, HARQ-ACK feedback for a DL transport block received in subframe n is transmitted in subframe n+4 at the earliest. In this regard, reference is made to FIG. 4. The PDSCH 120 is interspersed with the PDCCH 122. The sPUCCH is referenced 124. The first three subframes are in group 1 and the second three subframes are in group 2, these being in the same burst.

Figure 4:
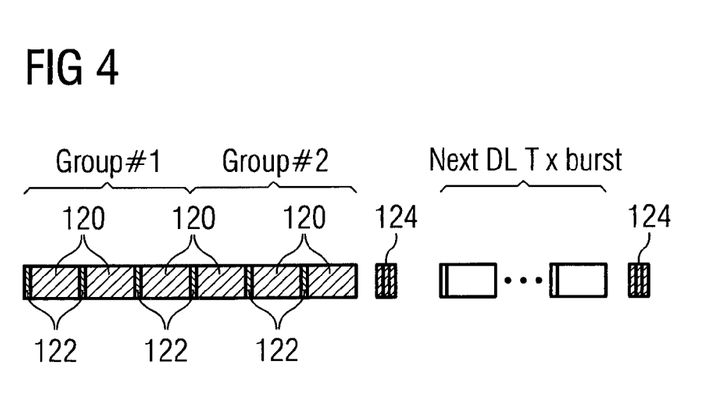
FIG. 4 shows group 1 and group 2 subframes and uplink acknowledgement channels.

In some embodiments in Group #1: HARQ-ACKs for DL HARQ are processed during the current DL Tx burst and in Group #2: HARQ-ACKs for DL HARQ are not processed during the current DL Tx burst, i.e., pending HARQ-ACKs The n+4 constraint results in having the following groups of DL subframes: Group #1: HARQ-ACKs for DL HARQ processes are processed during the current DL TX burst in the first sPUCCH 124; and Group #2: HARQ-ACKs for DL HARQ processes are not processed during the current DL TX burst. As the HARQ-ACKs are not ready to be transmitted after the end of current DL TX burst, they are referred to as pending HARQ-ACKs and may be sent in the sPUCCH 124 of the next burst. Alternative or additionally these may be transmitted by some another container such as ePUCCH or the HARQ-ACK may be multiplexed with UL data on for example the PUSCH.

The timing rules for the HARQ-ACK via the sPUCCH can be expressed by means of the following logic: Group #1: Use sPUCCH transmitted immediately after the end of current DL TX burst; and Group #2: if C-PDCCH corresponding to next DL TX OP (transmission opportunity) is detected, then convey Group #2 HARQ ACK via the sPUCCH transmitted immediately after the end of the next DL TX burst Alternative or additionally these may be transmitted by some another container such as ePUCCH or the HARQ-ACK may be multiplexed with UL data on for example the PUSCH.

The n+4 constraint may relate also to PUSCH scheduling. sPUCCH triggering may involve a shorter processing time requirement for example n+2.

Some embodiments may facilitate such a short processing time at the UE side.

Some embodiments, may provide system enablers to facilitate a UE processing time reduction at the UE side. As will be discussed in more detail, this may comprise UL design where UE may start generating the UL signal to be transmitted (e.g. HARQ-ACK on sPUCCH) without knowing the actual time (such as subframe index) where the transmission is going to take place.

Figure 5:
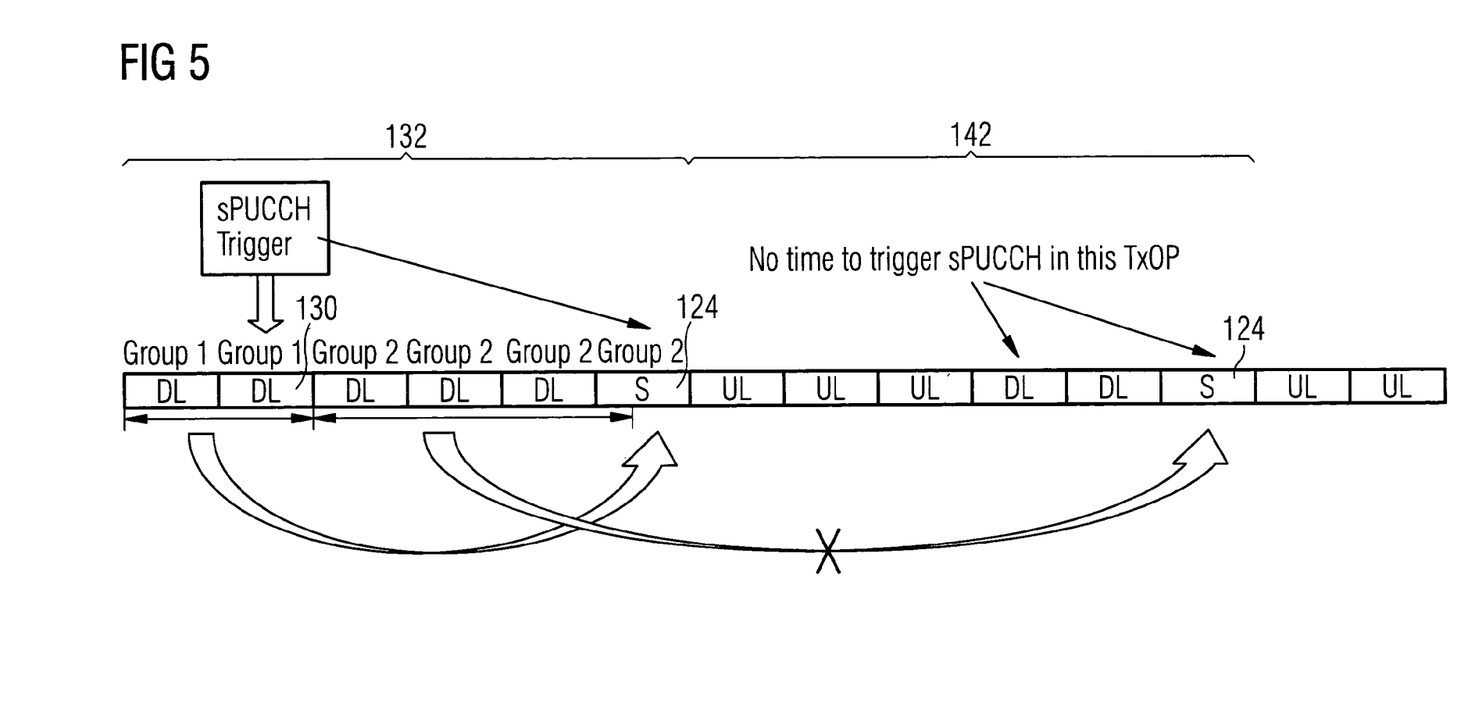
FIG. 5 shows a scenario where a UE is unable to provide an acknowledgement in a current burst.

Some embodiment may address issues relating to the UE processing time for C-PDCCH detection or more generally a UCI trigger. The UE may need to determine the subframe location of the UCI/sPUCCH from C-PDCCH or other UCI trigger. However, in some cases, Group #1 may not always exist. In these cases, UE may not have enough time to determine the UCI/sPUCCH location (especially when considering the n+4 constraint for UCI/sPUCCH triggering) for transmission of the pending HARQ-ACKs. In this regard, reference is made to FIG. 5 which shows this problem. When a DL burst (the $2^{nd}$ DL burst 142 in this example) has less than four DL subframes (here 2), there is no time to trigger a UCI/sPUCCH 124 during that DL burst. As a result, a transmission opportunity for the pending HARQ-ACKs from Group#2 from the first DL burst 132 is missed.

A consequence of this is that an eNB may not be able to utilize a DL TX burst with a short length. In the example shown in FIG. 5, the second burst 142 has only two DL subframes. As such the UCI/sPUCCH 124 cannot be triggered in a burst and keep the n+4 timing. This can be seen as a limitation related to unlicensed band operation. For example, in Japan the maximum burst length is only 4 ms.

One option may be to apply a time constraint other than (n+4) for sPUCCH trigger (e.g. n+2).

Some embodiments may provide for the preparing of an UCI packet in advance before receiving the actual trigger for UCI transmission. Thus in some embodiments, the UE may start generating UL signal to be transmitted (e.g. HARQ-ACK on sPUCCH) without knowing the actual time (such as subframe index) where the transmission is going to take place. Currently in LTE, UE cannot do this since the signal to be transmitted depends on the subframe/slot index due to the randomization schemes used.

Some embodiments relates to the sPUCCH triggered via the common downlink control information (DCI) message. This may for example be in MulteFire or the like system.

Some embodiments may facilitate favourable conditions for the UE such that HARQ-ACK transmission (and/or other UCI such as SR and/or CSI) can be prepared by the UE in advance without detecting the trigger for the actual transmission.

In some embodiments two modes of operation are provided for the UE. These modes of operation will now be described In the first mode of operation, triggering is based on a predefined timing constraint, e.g. n+4 constraint. The UCI generation is such that the UCI content (for example randomization applied for example on sequences) is dependent on the subframe number in which the UCI is transmitted. This may be optimized for scenarios where the duration of a DL burst is usually at least 4 subframes and/or interference randomization is prioritized over latency reduction. Efficient randomization is attractive in scenarios where frequency reuse 1 is applied or where co-channel coexistence occurs with another network using the same radio access technology. Frequency reuse 1 corresponds to frequency reuse typically used in cellular systems (i.e. the same resource elements are reused in the neighbouring cells). LBT as such results in TDM (time division multiplexing between cells). Supporting reuse 1 operation on top of LBT may require a specific arrangement.

The UCI may comprise one or more of: HARQ-Acknowledgements, channel state information (for example CQI (channel quality information), RI (rank indicator), PMI (precoding matrix indicator)); scheduling request indicator (SRI); and physical random access channel (PRACH)

Some embodiments may have a second mode. This mode may be optimized for example for Wi-Fi co-channel coexistence scenarios or other scenarios where the number of DL subframes in a burst is often less than 4 and/or where latency is potentially critical. The UCI generation is made independent of the subframe number in which the UCI transmission takes place (for example based on a cell-specific sequence which does not vary in time). The UE can trigger UCI with a relatively short processing time (for example n+2 n+1 or n+0). This second mode may be applied for one or more of: SR; SRS; HARQ/ACK; and CSI.

The eNB may select the configuration option via higher layer signalling, or dynamically. In this second mode, n+k, for example n+4 may be retained as a minimum constraint for the UE to process DL transport blocks and prepare transmission of the UCI information. The relaxed processing time may relates to UCI triggering only, i.e. the time between an UCI trigger, and the corresponding UCI transmission.

In some embodiments, the second mode of operation may be the default operation mode for channels operating with certain (for example the tightest) time constraint. For example, sPUCCH triggering based on the n+2 constraint may apply the second mode whereas ePUCCH triggering based on the n+4 constraint may apply the first mode.

Figure 6:
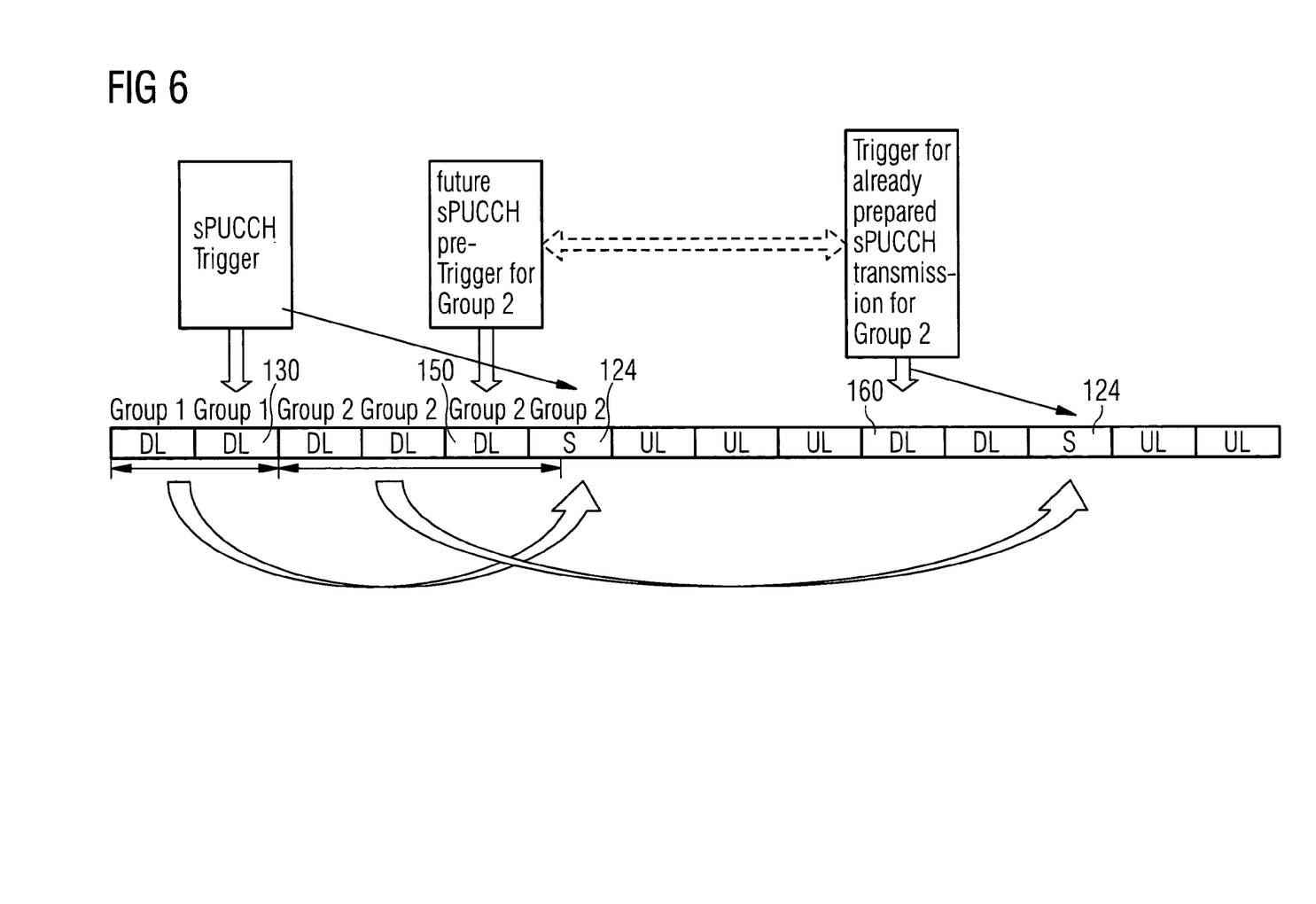
FIG. 6 shows an embodiment where a UE is able to prepare an acknowledgement in a current burst.

FIG. 6 shows schematically an embodiment, applied for the HARQ-ACK transmission in an unlicensed band scenario. In this case, the common PDCCH (C-PDCCH) acts as a UCI trigger. The UE can start preparing a UCI 124 transmission for the next TXOP already during the current TXOP based on a pre-trigger for example during a group 2 downlink subframe, referenced 150. This may be during any of the group 2 downlink subframes. In the example shown in FIG. 6, the pre-trigger is in the third group 2 downlink subframe. The pre-trigger may be explicitly indicated via a downlink control information, or alternatively the UE may by default prepare the UCI transmission after reception of one or more Group 2 (DL) subframes and detecting C-PDCCH/sPUCCH timing in the current TXOP (or DL TX burst). The UE is monitoring the C-PDCCH from the PDCCH using blind detection.

In one embodiment, when UE is configured to operate in the second mode, it may use C-PDCCH/sPUCCH timing corresponding to a current TXOP (or DL TX burst) as an implicit indicator to start preparing the UCI/sPUCCH transmission for the next TXOP. C-PDCCH/sPUCCH timing is used also to determine Group 1 and Group 2. In some embodiments, when UE has received the last subframe of group 2, it can start preparing the sPUCCH to be transmitted in the next Tx OP. At that time the UE already knows the HARQ-ACK content for the entire Group2 subframes.

In a further embodiment, additional dynamic signalling is introduced to switch between the first and second modes of operation. In the first mode of operation, the UE does not start preparing UCI transmission until detecting a C-PDCCH with UCI/sPUCCH trigger in the next TXOP. In the second mode of operation, the UE starts preparing UCI/sPUCCH transmission (for the next TXOP) after detecting a C-PDCCH with UCI/sPUCCH trigger in the current TXOP or at least before receiving the C-PDCCH with UCI/sPUCCH trigger corresponding the next TXOP.

This signalling may be provided in any suitable way. For example, the signalling may in the DL grant triggering the PDSCH or C-PDCCH.

Figure 8:
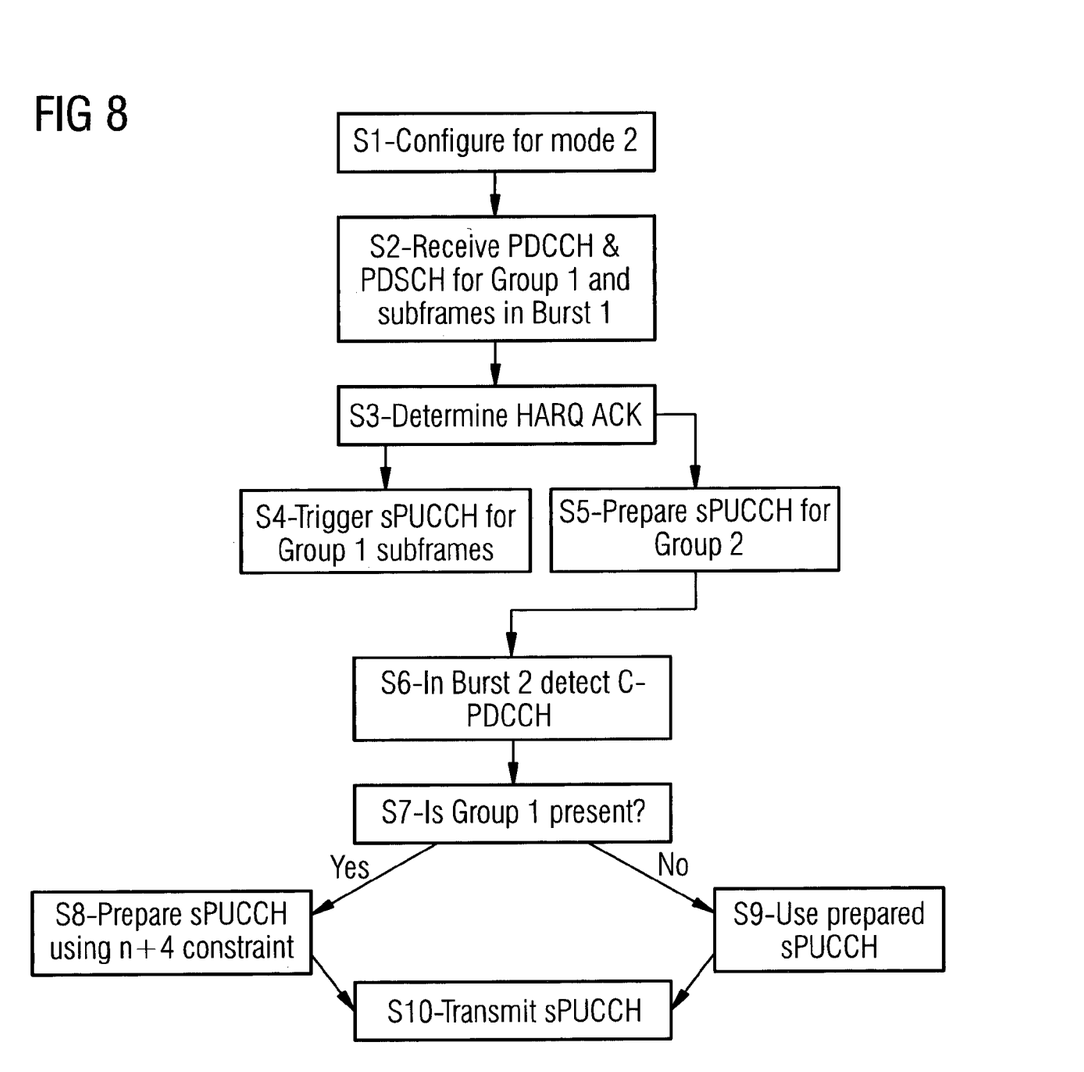
FIG. 8 shows an example of a method according to some embodiments.

Reference will now be made to FIG. 8 which shows a method of an embodiments.

In step S1, the UE is configured. The UE may be configured for mode 1 or mode 2. In this method, the UE is configured for mode 2. The UE may receive from the eNB, information which causes the UE to configure itself for mode 2. This information may be received for example via higher layer signalling (dedicated or common). The UE may also be configured for cell specific sequences (such as DMRS (demodulation reference signal) sequences) and/or randomization pattern(s) which may not vary from subframe to subframe.

In step S2, the UE receives from the eNB PDCCH and PDSCH corresponding to Group #1 and Group #2 subframes of the current TXOP—that is the DL TX burst.

In step S3, the UE determines the HARQ ACK for each HARQ process involved.

In step S4, the UE triggers the UCI transmission/sPUCCH for the group 1 subframes and subsequently transmits the UCI transmission/sPUCCH in the first burst.

In step S5, the UE prepares the UCI transmission/sPUCCH for group 2. This may be generally in parallel to step S4.

In step S6, in burst 2, a UCI transmission/sPUCCH trigger e.g. in C-PDCCH corresponding to the next TXOP is detected.

In step S7, it is determined if group 1 is present in the next TXOP, i.e. the next data burst.

If group 1 is present, then the next step is step S8 in which the UCI transmission/sPUCCH according to n+4 constraint (or other suitable timing constraint) is prepared.

If group 1 is not present, then the next step is step S9, and the UCI transmission/sPUCCH prepared in step S5 is considered as the UCI transmission/sPUCCH to be transmitted.

In step S10, the prepared UCI/sPUCCH is transmitted. The used resource may be derived from the last detected PDCCH used to assign PDSCH according to n+4 constraint. (That is, from last detected PDCCH but still 4 subframes prior to UCI transmission/sPUCCH)

Thus in some embodiments, when operating according to Mode 2, UCI generation is made independent of the subframe (and/or slot) index in which UCI transmission takes place. This may include one or more of the following features:
  DMRS sequence does not depend on the subframe index;
  Cyclic shift hopping (if applied) does not depend on the subframe index;
  Bit/symbol scrambling (if applied) does not depend on the subframe index; and
  Bit interleaving (if applied) does not depend on the subframe index.

In some embodiments, instead of the subframe index dependency, randomization may be based on the cell-specific sequences/patterns.

Some embodiments may supports short DL TX burst without increasing the UE detection burden.

Some embodiments may minimize latency with unlicensed band operation It should be appreciated that the UE prepares sPUCCH(s), which are not transmitted in the case when the next TXOP contains both Group#1 and Group#2 subframes, but only in the next TXOP or data burst only comprise Group#2 subframes.

It is noted that the above discussed issues are not limited to any particular communication environment, but may occur in any appropriate communication system.

Some embodiments may for example be used in 4G and/or 5G, for example NR technologies or similar technologies.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. One or more of the steps discussed in relation to FIG. 8 may be performed by one or more processors in conjunction with one or more memories.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to certain architectures, similar principles can be applied to other systems. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:
1. A method, comprising:
  receiving in data communication on unlicensed spectrum in a first downlink burst from a base station at least one first downlink transport block for which an acknowledgement is required;

preparing a first uplink channel for transmission of first uplink control information in which the acknowledgement of the first transport block is to be provided, wherein generation of the first uplink control information is independent of index information of a subframe in which the first uplink channel is transmitted;
not transmitting said first uplink channel, with said acknowledgement in an uplink burst immediately following the first downlink burst;
detecting a second downlink burst; wherein the second downlink burst is the next downlink burst following the first downlink burst; and
transmitting the first uplink channel in a subframe immediately following the end of the second downlink burst.

2. The method as claimed in claim 1, wherein the generation of the first uplink control information depends on a cell-specific sequence or pattern.

3. The method as claimed in claim 1, wherein processing of the acknowledgement for the first transport block cannot be completed during the first downlink burst.

4. The method as claimed in claim 1, further comprising:
receiving in the first downlink burst from the base station at least one second downlink transport block for which an acknowledgement is required;
preparing a second uplink channel for transmission of second uplink control information in which the acknowledgement of the second transport block is to be provided, wherein generation of the second uplink control information is dependent on subframe information in which the second uplink channel is transmitted; and
transmitting the second uplink channel in a subframe immediately following the first downlink burst.

5. A computer program product comprising a non-transitory computer-readable storage medium storing computer program code for use with a computer, the computer program code comprising code which, when run on a computer, causes the computer to perform:
receiving in data communication on unlicensed spectrum in a first downlink burst from a base station at least one first downlink transport block for which an acknowledgement is required;
preparing a first uplink channel for transmission of first uplink control information in which the acknowledgement of the first transport block is to be provided, wherein generation of the first uplink control information is independent of index information of a subframe in which the first uplink channel is transmitted;
not transmitting said first uplink channel, with said acknowledgement in an uplink burst immediately following the first downlink burst;
detecting a second downlink burst; wherein the second downlink burst is the next downlink burst following the first downlink burst; and
transmitting the first uplink channel in a subframe immediately following the end of the second downlink burst.

6. An apparatus comprising:
at least one processor; and
at least one memory including computer code for one or more programs, the at least one memory and the computer code configured, with the at least one processor, to cause the apparatus at least to:
receive in data communication on unlicensed spectrum in a first downlink burst from a base station at least one first downlink transport block for which an acknowledgement is required;
prepare a first uplink channel for transmission of first uplink control information in which the acknowledgement of the first transport block is to be provided, wherein generation of the first uplink control information is independent of index information of a subframe in which the first uplink channel is transmitted;
not transmit said first uplink channel, with said acknowledgement in an uplink burst immediately following the first downlink burst;
detect a second downlink burst; wherein the second downlink burst is the next downlink burst following the first downlink burst; and
transmit the first uplink channel in a subframe immediately following the end of the second downlink burst.

7. The apparatus as claimed in claim 6, wherein the generation of the first uplink control information depends on a cell-specific sequence or pattern.

8. The apparatus as claimed in claim 6, wherein processing of the acknowledgement for the first transport block cannot be completed during the first downlink burst.

9. The apparatus as claimed in claim 6, wherein the computer code is further configured, with the at least one processor, to cause the apparatus to:
receive in the first downlink burst from the base station at least one second downlink transport block for which an acknowledgement is required;
prepare a second uplink channel for transmission of second uplink control information in which the acknowledgement of the second transport block is to be provided, wherein generation of the second uplink control information is dependent on subframe information in which the second uplink channel is transmitted; and
transmit the second uplink channel in a subframe immediately following the first downlink burst.

10. A method, comprising:
transmitting in data communication on unlicensed spectrum in a first downlink burst from a base station at least one downlink transport block for which an acknowledgement is required;
not receiving in an uplink burst immediately following the first downlink burst a first uplink channel providing first uplink control information comprising the acknowledgement of the first transport block;
transmitting a second downlink burst; wherein the second downlink burst is the next downlink burst following the first downlink burst; and
receiving the first uplink channel in a subframe immediately following the end of the second downlink burst;
wherein the first uplink control information in the received first uplink channel has been generated independent of index information of a subframe in which the first uplink channel has been transmitted.

11. The method as claimed in claim 10, wherein the generation of the first uplink control information depends on a cell-specific sequence or pattern.

12. The method as claimed in claim 10, further comprising:
transmitting in the first downlink burst at least one second downlink transport block for which an acknowledgement is required; and
receiving in an uplink burst immediately following the first downlink burst a second uplink channel providing second uplink control information comprising the acknowledgement of the second transport block;
wherein the second uplink control information in the received second uplink channel has been generated dependent on subframe information in which the second uplink channel has been transmitted.

13. A computer program product comprising a non-transitory computer-readable storage medium storing computer program code for use with a computer, the computer program code comprising code which, when run on a computer, causes the computer to perform:
  transmitting in data communication on unlicensed spectrum in a first downlink burst from a base station at least one downlink transport block for which an acknowledgement is required;
  not receiving in an uplink burst immediately following the first downlink burst a first uplink channel providing first uplink control information comprising the acknowledgement of the first transport block;
  transmitting a second downlink burst; wherein the second downlink burst is the next downlink burst following the first downlink burst; and
  receiving the first uplink channel in a subframe immediately following the end of the second downlink burst;
  wherein the first uplink control information in the received first uplink channel has been generated independent of subframe information in which the first uplink channel has been transmitted.

14. An apparatus, comprising:
  at least one processor; and
  at least one memory including computer code for one or more programs, the at least one memory and the computer code configured, with the at least one processor, to cause the apparatus at least to:
  cause transmission in data communication on unlicensed spectrum in a first downlink burst from a base station of at least one downlink transport block for which an acknowledgement is required;
  not receive in an uplink burst immediately following the first downlink burst a first uplink channel providing first uplink control information comprising the acknowledgement of the first transport block;
  cause transmission of a second downlink burst; wherein the second downlink burst is the next downlink burst following the first downlink burst; and
  receive the first uplink channel in a subframe immediately following the end of the second downlink burst;
  wherein the first uplink control information in the received first uplink channel has been generated independent of subframe information in which the first uplink channel has been transmitted.

15. The apparatus as claimed in claim 14, wherein the generation of the first uplink control information depends on a cell-specific sequence or pattern.

16. The apparatus as claimed in claim 14, wherein the computer code is further configured, with the at least one processor, to cause the apparatus to:
  transmit in the first downlink burst at least one second downlink transport block for which an acknowledgement is required; and
  receive in an uplink burst immediately following the first downlink burst a second uplink channel providing second uplink control information comprising the acknowledgement of the second transport block;
  wherein the second uplink control information in the received second uplink channel has been generated dependent on subframe information in which the second uplink channel has been transmitted.

* * * * *